United States Patent
Hirota et al.

(10) Patent No.: US 10,933,396 B2
(45) Date of Patent: Mar. 2, 2021

(54) FLUIDIZED BED REACTOR

(71) Applicant: TOKUYAMA CORPORATION, Yamaguchi (JP)

(72) Inventors: Kenji Hirota, Yamaguchi (JP); Katsuya Ogihara, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 16/756,041

(22) PCT Filed: Nov. 16, 2018

(86) PCT No.: PCT/JP2018/042560
§ 371 (c)(1),
(2) Date: Apr. 14, 2020

(87) PCT Pub. No.: WO2019/098348
PCT Pub. Date: May 23, 2019

(65) Prior Publication Data
US 2020/0306713 A1 Oct. 1, 2020

(30) Foreign Application Priority Data
Nov. 20, 2017 (JP) .............................. JP2017-223141

(51) Int. Cl.
*B01J 8/02* (2006.01)
*B01J 8/18* (2006.01)
(Continued)

(52) U.S. Cl.
CPC ................. *B01J 8/24* (2013.01); *B01J 8/025* (2013.01); *C01B 33/107* (2013.01)

(58) Field of Classification Search
CPC ..... B01J 8/00; B01J 8/02; B01J 8/0242; B01J 8/025; B01J 8/18; B01J 8/24; B01J 19/24;
(Continued)

(56) References Cited

U.S. PATENT DOCUMENTS

| | | |
|---|---|---|
| 2010/0061901 A1 | 3/2010 | Narukawa |
| 2010/0183496 A1 | 7/2010 | Narukawa |

(Continued)

FOREIGN PATENT DOCUMENTS

| | | |
|---|---|---|
| EP | 0256876 | 2/1988 |
| JP | 53-127396 | 11/1978 |

(Continued)

OTHER PUBLICATIONS

International Preliminary Report on Patentability for PCT/JP2018/042560, dated May 26, 2020, 6 pages.
(Continued)

*Primary Examiner* — Natasha E Young
(74) *Attorney, Agent, or Firm* — Casimir Jones, SC; Robert A. Goetz

(57) ABSTRACT

Provided is a fluidized bed reactor (1) that makes it possible to stably measure a temperature distribution in the fluidized bed reactor (1) while no damage is caused to a temperature measuring section. Provided is a fluidized bed reactor (1) configured to generate trichlorosilane by reacting metallurgical grade silicon powder and hydrogen chloride gas, the fluidized bed reactor (1) including: a reaction vessel (10); and a plurality of temperature measuring sections (50), provided on an outer surface of the reaction vessel (10), each for measuring a temperature inside the reaction vessel (10).

7 Claims, 1 Drawing Sheet

(51) Int. Cl.
  *B01J 8/24* (2006.01)
  *B01J 19/24* (2006.01)
  *C01B 33/107* (2006.01)

(58) Field of Classification Search
  CPC ....... C01B 33/00; C01B 33/08; C01B 33/107; C01B 33/1071
  See application file for complete search history.

(56) References Cited

U.S. PATENT DOCUMENTS

| | | | |
|---|---|---|---|
| 2011/0297884 A1* | 12/2011 | Chee | B01J 8/44 252/372 |
| 2012/0164053 A1 | 6/2012 | Narukawa | |
| 2014/0154140 A1 | 6/2014 | Chichester et al. | |
| 2016/0131584 A1 | 5/2016 | Goebel | |

FOREIGN PATENT DOCUMENTS

| | | |
|---|---|---|
| JP | 63-51390 | 3/1988 |
| JP | 10-111187 | 4/1998 |
| JP | 2008-150274 | 7/2008 |
| JP | 2010-189256 | 9/2010 |
| JP | 2017-129588 | 7/2017 |
| WO | 2014/008258 | 1/2014 |

OTHER PUBLICATIONS

International Search Report for PCT/JP2018/042560, dated Dec. 11, 2018, 1 page.
Syunsuke Kubota et al., "Monitoring of equipment with optical fiber temperature distribution measurement system", Feb. 4, 2011, document distributed at Lecture on glass production technique, 21 pages.
Communication pursuant to Rule114(2) EPC issued for 188788571.1, dated May 29, 2020, 35 pages.

* cited by examiner

FLUIDIZED BED REACTOR

This application is a national stage application claiming priority to PCT/JP2018/042560, now WO 2019/098348, filed on Nov. 16, 2018, which claims priority to Japan Patent Application Serial No. JP 2017-223141, filed on Nov. 20, 2017.

TECHNICAL FIELD

The present invention relates to a fluidized bed reactor, particularly to a fluidized bed reactor configured to generate trichlorosilane by reacting metallurgical grade silicon powder and hydrogen chloride gas.

BACKGROUND ART

A fluidized bed reactor (herein also merely referred to as an "apparatus") is used as an apparatus for generating trichlorosilane by reacting metallurgical grade silicon powder and hydrogen chloride gas. According to the apparatus, in a reaction vessel of the apparatus, metallurgical grade silicon powder and hydrogen chloride gas form a fluidized bed, and a reaction between the metallurgical grade silicon powder and the hydrogen chloride gas occurs, so that trichlorosilane can be generated.

Specifically, in a reaction in which trichlorosilane is generated, a fluidized bed is formed by supplying hydrogen chloride gas from a lower part of the reaction vessel so as to cause a flow of metallurgical grade silicon powder. In this case, a first region, a second region, or the like may be produced. The first region is a region in which the reaction in which trichlorosilane is generated sharply occurs due to insufficient cooling carried out with use of a cooler for cooling the fluidized bed. The second region is a region in which the reaction in which trichlorosilane is generated does not sufficiently occur because hydrogen chloride gas is insufficiently supplied due to blocking of a gas supply port by metallurgical grade silicon powder. In a case where operation is continued while such a region thus produced is left as it is, trichlorosilane is unstably generated. This may lead to breakage of the apparatus and/or occurrence of a serious accident depending on circumstances. Thus, it is an important step for stable operation of the apparatus to (i) monitor a state of reaction between metallurgical grade silicon powder and hydrogen chloride gas and (ii) suitably control the state of reaction in accordance with a result of the monitoring.

The above state of reaction is commonly monitored by directly measuring a reaction temperature at which metallurgical grade silicon powder and hydrogen chloride gas react with each other in a fluidized bed. Thus, a fluidized bed reactor including a temperature measuring section configured to measure the reaction temperature has been conventionally reported as a fluidized bed reactor configured to generate trichlorosilane (Patent Literature 1). Patent Literature 1 discloses a trichlorosilane producing apparatus (fluidized bed reactor) including a thermometer, provided in a reactor (reaction vessel), for measuring a temperature inside the trichlorosilane producing apparatus.

CITATION LIST

Patent Literature

[Patent Literature 1]
Japanese Patent Application Publication Tokukai No. 2010-189256

SUMMARY OF INVENTION

Technical Problem

As described earlier, a conventional fluidized bed reactor, which is considered to make it impossible to measure an accurate temperature distribution in a fluidized bed without measuring a temperature in the fluidized bed, includes a temperature measuring section (thermometer) provided in a reaction vessel. Note, however, that according to the conventional fluidized bed reactor, the temperature measuring section provided in the reaction vessel is damaged by a flow of metallurgical grade silicon powder and hydrogen chloride gas. As a result, the inventors of the present invention uniquely found that a temperature distribution in the fluidized bed reactor unfortunately cannot be stably measured.

An embodiment of the present invention has been made in view of the problems, and an object of the present invention is to provide a novel fluidized bed reactor and a novel trichlorosilane producing method each of which allows a temperature distribution in a fluidized bed reactor to be stably measured while no damage is caused to a temperature measuring section.

Solution to Problem

The inventors of the present application repeatedly carried out diligent study so as to solve the problems described earlier. For example, the inventors of the present application (i) measured (a) a temperature of an outer surface of a reaction vessel of a fluidized bed reactor and (b) a temperature inside the reaction vessel and (ii) studied a difference between the temperature of the outer surface and the temperature inside the reaction vessel. As a result, the inventors of the present application obtained knowledge that the temperature of the outer surface and the temperature inside the reaction vessel are surprisingly extremely highly correlated with each other. Then, in accordance with such knowledge, the inventors of the present application finally accomplished the present invention by finding the following: In a case where a fluidized bed reactor includes a plurality of temperature measuring sections, provided on an outer surface of a reaction vessel of the fluidized bed reactor, each for measuring a temperature inside the reaction vessel, an anomaly in a temperature distribution in the reaction vessel can be extremely accurately detected, so that the problems described earlier can be solved.

Specifically, an embodiment of the present invention includes the following features.

A fluidized bed reactor configured to generate trichlorosilane by reacting metallurgical grade silicon powder and hydrogen chloride gas, the fluidized bed reactor including: a reaction vessel; and a plurality of temperature measuring sections, provided on an outer surface of the reaction vessel, each for measuring a temperature inside the reaction vessel.

A method for producing trichlorosilane by reacting metallurgical grade silicon powder and hydrogen chloride gas, the method including: a temperature measuring step of measuring, from an outside of a reaction vessel of a fluidized bed reactor, a temperature inside the reaction vessel.

Advantageous Effects of Invention

According to an embodiment of the present invention, a plurality of temperature measuring sections each for measuring a temperature inside a reaction vessel are provided on an outer surface of the reaction vessel. This prevents a temperature measuring section from being exposed to a region in which metallurgical grade silicon powder flows, so that the temperature measuring section is not damaged. This brings about an effect of stably and accurately measuring a temperature distribution in a fluidized bed.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Specifically, any embodiment based on a proper combination of technical means disclosed in different embodiments is also encompassed in the technical scope of the present invention. Note that all of the patent literatures listed herein are incorporated by reference herein. Note also that numerical expressions such as "X to Y" herein mean "not less than X (equal to or more than X) and not more than Y (equal to or less than Y)" unless otherwise specified.

[1. Overview of the Present Invention]

A conventional fluidized bed reactor has the problems described earlier in [Technical Problem]. This is because it is conventionally considered impossible to measure an accurate temperature distribution in a reaction vessel without providing a temperature measuring section in the reaction vessel.

In order to solve the problems described earlier, the inventors of the present invention carried out diligent study. As a result, the inventors of the present invention surprisingly found the following. Specifically, even in a case where a fluidized bed reactor is configured to include a temperature measuring section, provided on an outer surface of a reaction vessel, for measuring a temperature inside the reaction vessel, it is possible to stably measure a temperature inside the fluidized bed reactor. Note that the temperature measuring section, which is provided outside the reaction vessel, is not damaged by a fluidized bed of metallurgical grade silicon powder.

As described earlier, the present invention has solved conventional problems from a viewpoint that has not been considered at all in conventional common general technical knowledge. Furthermore, the present invention has been obtained from a viewpoint that should be conventionally absolutely avoided for the purpose of measuring a temperature inside a reaction vessel. This makes it impossible for a person skilled in the art to easily attain the present invention in accordance with conventional techniques.

[2. Fluidized Bed Reactor]

A fluidized bed reactor in accordance with an embodiment of the present invention is described below with reference to FIGS. 1 and 2.

The "fluidized bed reactor in accordance with an embodiment of the present invention" is herein also merely referred to as "the present apparatus".

Figure 1:
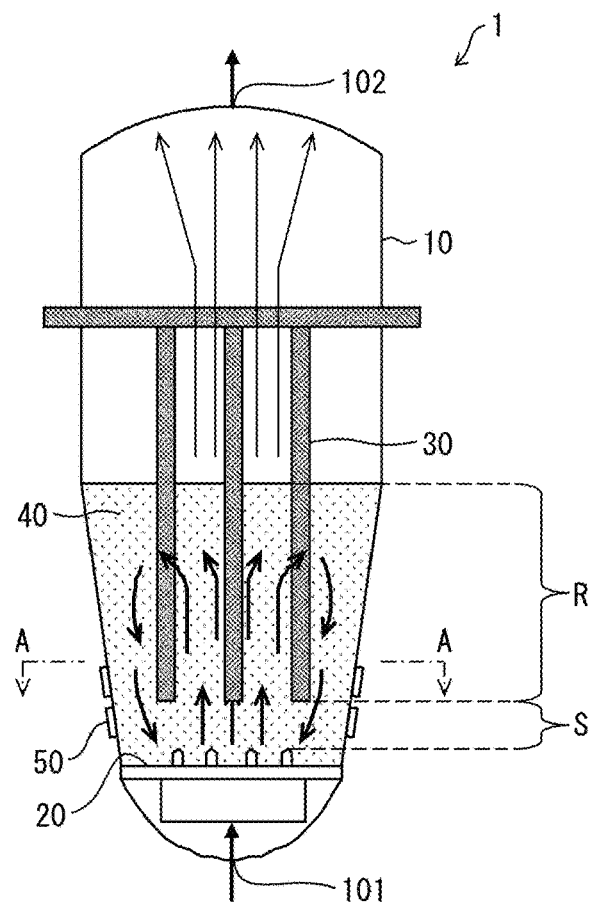
FIG. 1 is a cross-sectional view schematically illustrating a fluidized bed reactor in accordance with an embodiment of the present invention as viewed from a horizontal direction.

FIG. 1 is a cross-sectional view schematically illustrating a fluidized bed reactor 1 in accordance with an embodiment of the present invention as viewed from a horizontal direction. The present apparatus 1 is an apparatus for producing trichlorosilane ($SiHCl_3$) by reacting metallurgical grade silicon powder (Si) and hydrogen chloride gas (HCl). The present apparatus 1 includes a reaction vessel 10, a distributor plate 20, heating medium pipes 30, and temperature measuring sections 50. According to the present apparatus 1, metallurgical grade silicon powder is supplied into the reaction vessel 10, and hydrogen chloride gas to react with metallurgical grade silicon powder is supplied into the reaction vessel 10 via a gas supply port 101 provided in a lower part (e.g., a bottom part) of the reaction vessel 10. The distributor plate 20 is provided above the gas supply port 101 of the reaction vessel 10 so as to distribute hydrogen chloride supplied into the reaction vessel 10.

The present apparatus 1 (i) causes a reaction between (a) metallurgical grade silicon powder in the reaction vessel 10 and (b) hydrogen chloride gas while causing the metallurgical grade silicon powder to flow by the hydrogen chloride gas and (ii) takes out, via an outlet 102 of the reaction vessel 10, trichlorosilane generated through the reaction between the metallurgical grade silicon powder and the hydrogen chloride gas.

In order that (i) the metallurgical grade silicon powder is allowed to flow effectively in the reaction vessel 10 or (ii) a reaction temperature is easily controlled in the reaction vessel 10, hydrogen gas together with hydrogen chloride gas can be supplied via the gas supply port 101 of the reaction vessel 10.

In this case, a fluidized bed 40 constituted by metallurgical grade silicon powder that has flowed by hydrogen chloride gas (and optionally hydrogen gas) is formed in the reaction vessel 10. A region of the fluidized bed 40 in which region the heating medium pipes 30 are provided, specifically, a region of the fluidized bed 40 which region extends in a vertical direction and ranges from an upper end of the fluidized bed 40 to a lower end of a heating medium pipe 30 is referred to as a region R. A region of the fluidized bed in which region no heating medium pipe 30 is provided, specifically, a region of the fluidized bed 40 which region extends in the vertical direction and ranges from the lower end of the heating medium pipe 30 to an upper end of the gas supply port 101 is referred to as a region S. Bold arrows in FIG. 1 each indicate a flow of metallurgical grade silicon powder in the fluidized bed 40. Thin arrows in FIG. 1 each indicate a flow of trichlorosilane generated, in the fluidized bed 40, by a reaction between hydrogen chloride gas and metallurgical grade silicon powder.

The heating medium pipes 30 through each of which a heating medium is caused to flow are vertically provided in the reaction vessel 10. Specifically, the heating medium pipes 30 are each provided so as to (i) be at least partially located in the fluidized bed 40 and (ii) be located above the gas supply port 101 so as to be at a certain distance from the gas supply port 101. Heat of reaction generated by a reaction between metallurgical grade silicon powder and hydrogen chloride gas is removed by causing a heating medium to flow through each of the heating medium pipes 30.

The temperature measuring sections 50 are provided on an outer surface of the reaction vessel 10 and each measure a temperature inside the present apparatus 1.

Note that, since a flow of metallurgical grade silicon powder and hydrogen chloride gas to the present apparatus 1 is described in, for example, Japanese Patent Application Publication Tokukai No. 2011-184242, a description thereof is omitted here while a description in that publication is quoted as appropriate. Note also that, since a flow of trichlorosilane which has been taken out from the present apparatus 1 is described in, for example, Japanese Patent Application Publication Tokukai No. 2015-089859, a description thereof is omitted here while a description in that publication is quoted as appropriate.

(Reaction Vessel 10)

The reaction vessel 10 of the present apparatus 1 is a reaction vessel that is used to produce trichlorosilane by reacting metallurgical grade silicon powder and hydrogen chloride gas in the reaction vessel.

According to an embodiment of the present invention, a reaction vessel is preferably made of a material that is not limited to any particular material but is selected as appropriate based on the following viewpoints: (i) a viewpoint that the material can withstand various conditions (e.g., a temperature and a pressure) under which a reaction between metallurgical grade silicon powder and hydrogen chloride gas occurs in the reaction vessel; (ii) a viewpoint that the material can withstand (a) wear caused by flowing metallurgical grade silicon powder and (b) corrosion caused by hydrogen chloride gas; and (iii) a viewpoint that the material allows the temperature inside the reaction vessel to be suitably transferred to an outer surface of the reaction vessel.

Note here that "an inside of a reaction vessel" herein means, in particular, "a fluidized bed" thereof and may also be referred to as "an inside of a fluidized bed reactor". Thus, the terms "an inside of a fluidized bed reactor", "an inside of a reaction vessel", and "a fluidized bed" can be herein interchangeably used.

According to an embodiment of the present invention, a selectable material of which a reaction vessel is made is exemplified by metals such as nickel, nickel-base alloys (such as Incoloy and Inconel), and stainless steel (SUS), based on the viewpoints (described earlier). Of these metals, SUS has high cost performance, and a nickel-base alloy can prevent production of a compound of iron and silicon (Fe—Si), which compound is produced as a by-product during production of trichlorosilane.

The expression "allows the temperature inside the reaction vessel to be suitably transferred to the outer surface of the reaction vessel" means allowing the temperature inside the reaction vessel to be transferred to the outer surface of the reaction vessel so that a difference in temperature between the inside and the outer surface of the reaction vessel is not more than 20 C°. Such suitable transfer of the temperature can be achieved by providing a suitable heat insulating material to the outer surface of the reaction vessel. According to an embodiment of the present invention, the heat insulating material of the reaction vessel is not limited to any particular heat insulating material. Note, however, that an amount of heat dissipated into the air is preferably 50 W/m$^2$ to 400 W/m$^2$, more preferably 50 W/m$^2$ to 200 W/m$^2$, and even more preferably 50 W/m$^2$ to 100 W/m$^2$ on the outer surface of the reaction vessel which has the heat insulating material.

The shape of the reaction vessel 10 (i.e., the shape of a side wall of the reaction vessel 10) is not limited to any particular shape. For example, a side wall surrounding the fluidized bed 40 of the reaction vessel 10 can have (i) a shape (not illustrated) such that a cutting plane orthogonal to a direction of height of the reaction vessel 10 has a constant area or (ii) a tapered shape (FIG. 1) such that the cutting plane has an area that increases upward. For example, in a range of at least 80% of the height between the gas supply port and an upper surface of the fluidized bed, the side wall can have a tapered shape such that the cutting plane orthogonal to the direction of height of the reaction vessel has an area that increases upward. The reaction vessel 10 preferably has a tapered shape because such a shape makes it possible to (i) reduce the risk of erosion and (ii) prevent a local rise in temperature.

(Distributor Plate 20)

The distributor plate 20 is configured to distribute hydrogen chloride supplied into the reaction vessel 10 via the gas supply port 101. It is possible to suitably use a conventionally publicly known distributor plate as the distributor plate 20.

In FIG. 1, many distributor nozzles for distributing hydrogen chloride supplied into the reaction vessel via the gas supply port are vertically fixed to the distributor plate 20 so as to be through the distributor plate 20. These distributor nozzles have (i) respective upper end openings provided on the fluidized bed 40 side and (ii) respective lower end openings provided on the gas supply port 101 side.

In FIG. 1, metallurgical grade silicon powder is caused to flow by hydrogen chloride gas supplied via the distributor plate 20, so that the fluidized bed 40 is formed. Specifically, the fluidized bed 40 is formed above the distributor plate 20. In contrast, in a case where the fluidized bed reactor includes no distributor plate, metallurgical grade silicon powder is caused to flow by hydrogen chloride supplied via the gas supply port, so that the fluidized bed is formed. Specifically, the fluidized bed is formed above the gas supply port.

(Heating Medium Pipe 30)

A heating medium pipe 30, through which a heating medium flows, is configured to remove heat of reaction generated by a reaction between metallurgical grade silicon powder and hydrogen chloride gas. It is possible to suitably use a conventionally publicly known heating medium pipe as the heating medium pipe 30.

(Temperature Measuring Section 50)

The temperature measuring sections 50, each of which serves as a means for measuring the temperature inside the present apparatus 1, are provided on the outer surface of the reaction vessel 10.

The present apparatus, which includes the temperature measuring sections provided on the outer surface of the reaction vessel, has the following advantages of: (i) making it possible to stably measure the temperature inside the fluidized bed reactor without causing any damage to the temperature measuring sections; (ii) making it possible to easily measure, from an outside of the reaction vessel, a reaction temperature inside the reaction vessel, at which reaction temperature metallurgical grade silicon powder and hydrogen chloride gas react with each other, and consequently to understand (estimate), in real time from the reaction temperature, a state of reaction between metallurgical grade silicon powder and hydrogen chloride gas in the fluidized bed; and (iii) during production of trichlorosilane, making it possible to determine a poor flow of metallurgical grade silicon powder in the fluidized bed and being useful for stable operation of the fluidized bed reactor.

The "reaction temperature at which metallurgical grade silicon powder and hydrogen chloride gas react with each other" may be herein merely referred to as a "reaction temperature", and the "state of reaction between metallurgical grade silicon powder and hydrogen chloride gas" may be herein merely referred to as a "state of reaction".

A temperature measuring section 50, which only needs to be capable of measuring the reaction temperature, can be a conventionally publicly known temperature measuring machine. Examples of the conventionally publicly known temperature measuring machine include at least one temperature measuring machine selected from the group consisting of, for example, an N thermocouple, a K thermocouple, an E thermocouple, and a J thermocouple.

According to the present apparatus 1 of FIG. 1, the temperature measuring section 50 is provided on the outer surface of the present apparatus 1 (specifically, the reaction vessel 10). Thus, unlike a case where a temperature measuring section is provided in a fluidized bed reactor as in a conventional technique, there is no fear that the temperature measuring section 50 may be physically and chemically damaged by flowing metallurgical grade silicon powder and hydrogen chloride gas.

According to an embodiment of the present invention, a plurality of temperature measuring sections can be provided on an outer surface of a reaction vessel, and it is not particularly limited specifically how to provide the plurality of temperature measuring sections. For example, the plurality of temperature measuring sections can be fixed to the outer surface of the reaction vessel with use of, for example, metal fittings (e.g., screws) or an adhesive.

The term "plurality" herein means an integer of not less than 2. The present apparatus can be an apparatus including not less than 2 temperature measuring sections which are provided on an outer surface of a reaction vessel and whose number is not limited to any particular number. For example, the present apparatus can be configured to include preferably not less than 4, more preferably not less than 8, even more preferably not less than 16, and particularly preferably not less than 24 temperature measuring sections provided in the outer surface of the reaction vessel. The present apparatus thus configured makes it possible to measure the reaction temperature in many regions in the fluidized bed. This allows the state of reaction to be accurately understood (estimated) in real time. During production of trichlorosilane, it is possible to accurately determine a poor flow of metallurgical grade silicon powder, and consequently to achieve more stable operation of the fluidized bed reactor.

According to the present apparatus 1, a plurality of, specifically, 12 temperature measuring sections 50 are horizontally provided on the outer surface of the reaction vessel 10. This forms a row of temperature measuring sections 50. Furthermore, according to the present apparatus 1, two rows of temperature measuring sections 50 are provided, on the outer surface of the reaction vessel 10, in a direction perpendicular to the horizontal direction. Specifically, the present apparatus 1 includes two rows of temperature measuring sections 50 that are provided such that three temperature measuring sections 50 to four temperature measuring sections 50 are circumferentially arranged per meter in a single row, and four of the temperature measuring sections 50 are illustrated in FIG. 1.

Figure 2:
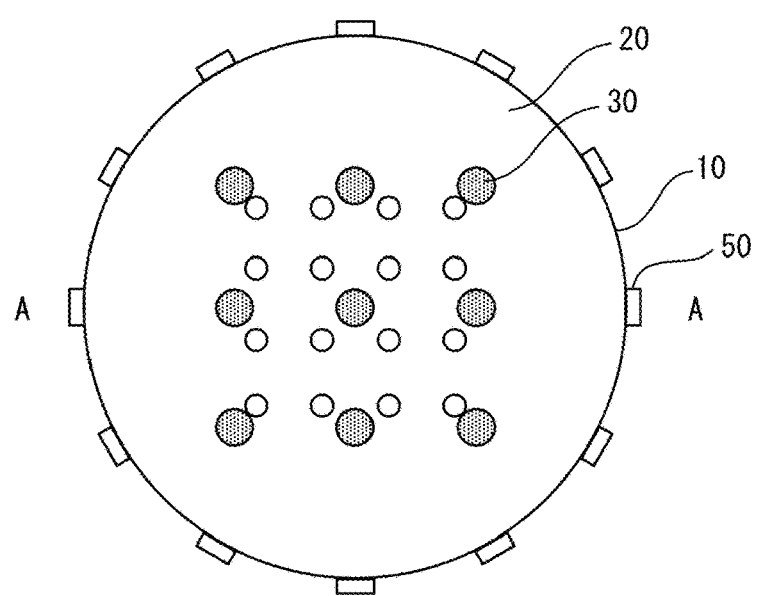
FIG. 2 is a view illustrating a part of the cross-sectional view, viewed along arrows A-A of FIG. 1.

The following description discusses, with reference to FIG. 2, where in the outer surface of the reaction vessel 10 the temperature measuring sections 50 of the present apparatus 1 are located. FIG. 2 is a view illustrating a part of the cross-sectional view of the present apparatus 1, viewed along arrows A-A of FIG. 1. FIG. 2 is also a horizontal cross-sectional view of the present apparatus 1. As illustrated in FIG. 2, the present apparatus 1 has a circular horizontal cross section. Note, however, that the fluidized bed reactor does not need to have any particular shape in another embodiment of the present invention.

FIG. 2 illustrates one of the aforementioned two rows of temperature measuring sections 50 which one is provided on a vertically upper side. The other one (i.e., a row provided on a vertically lower side) of the aforementioned two rows of temperature measuring sections 50 is not illustrated in FIG. 2. Note, however, that the other one and the row of temperature measuring sections 50, which row is illustrated in FIG. 2, are identical in location on the outer surface of the reaction vessel 10.

According to the reaction vessel 10, the temperature measuring sections 50 are provided along an entire circumference of the outer surface of the reaction vessel 10 (see FIG. 2). Note here that the expression "along the entire circumference of the outer surface" herein means "in the horizontal direction of the outer surface and at regular intervals". Thus, in the reaction vessel 10 of FIG. 2, the temperature measuring sections 50 are provided in the horizontal direction of the outer surface of the reaction vessel and at regular intervals. Note also that the expression "in the horizontal direction of the outer surface" is herein synonymous with "along the horizontal circumference of the outer surface".

According to a method for producing trichlorosilane with use of the present apparatus, a reaction between metallurgical grade silicon powder and hydrogen chloride gas preferably occurs, around a vertically extending central axis of the reaction vessel, substantially equally on a horizontal plane. This allows stable operation of the fluidized bed reactor, so that a higher yield of resultant trichlorosilane can be achieved.

This makes it important to accurately understand whether the reaction between metallurgical grade silicon powder and hydrogen chloride gas occurs, around the central axis, substantially equally on the horizontal plane in the fluidized bed reactor.

The present apparatus, which includes a plurality of temperature measuring sections provided along an entire circumference of an outer surface of a reaction vessel, makes it possible to measure a reaction temperature along the entire circumference of the outer surface. This makes it possible to accurately understand whether a reaction between metallurgical grade silicon powder and hydrogen chloride gas occurs, around the central axis, substantially equally on the horizontal plane.

According to an embodiment of the present invention, a row of temperature measuring sections is not limited to a row of a plurality of temperature measuring sections that are horizontally provided on an outer surface of a reaction vessel, but can include a row of a plurality of temperature measuring sections that are provided along any straight line or any curve.

According to the present apparatus, a plurality of rows of a plurality of temperature measuring sections are preferably provided on an outer surface of a reaction vessel. Note, however, that a configuration of the present apparatus is not limited to this. A fluidized bed reactor including (i) only a single row of a plurality of temperature measuring sections that are provided on an outer surface of a reaction vessel or (ii) a plurality of temperature measuring sections that are provided on the outer surface of the reaction vessel without being formed in a row is also within the scope of the present invention.

In FIG. 1, the present apparatus 1 includes the aforementioned two rows of temperature measuring sections 50 which rows are both provided in a vicinity of the gas supply port 101 provided to the reaction vessel 10, more specifically, in a vicinity of the distributor plate 20.

Note here that the expression "in the vicinity of the gas supply port" herein means "within a range of a vertical height of the fluidized bed, up to 20% of the height of the fluidized bed from a lower end of the fluidized bed". Thus, the expression "the temperature measuring sections provided in the vicinity of the gas supply port" means the temperature measuring sections that are provided on the outer surface of the reaction vessel within the range of the height, up to 20% of the height of the fluidized bed from the lower end of the fluidized bed, when the fluidized bed is viewed from the horizontal direction.

As described earlier, in a case where the fluidized bed reactor includes the distributor plate, the fluidized bed is provided on the distributor plate, and thus the lower end of the fluidized bed corresponds to an upper surface of the distributor plate. In contrast, in a case where the fluidized bed reactor includes no distributor plate, the fluidized bed is provided on the gas supply port, and thus the lower end of the fluidized bed corresponds to a horizontal plane on which the upper end of the gas supply port is located.

According to the present apparatus, the vicinity of the gas supply port is a vicinity of a gas supply port via which hydrogen chloride gas is supplied. Thus, as compared with a place distant from the gas supply port (the place is also an upper part of the fluidized bed), the vicinity of the gas supply port is a region in which metallurgical grade silicon powder and hydrogen chloride gas particularly violently react with each other, and it is therefore important to understand a state of reaction between metallurgical grade silicon powder and hydrogen chloride gas in the region.

In FIG. 1, the present apparatus 1 includes the aforementioned two rows of temperature measuring sections 50 which rows are provided such that one and the other one of the two rows of temperature measuring sections 50 are located in (i) a region in which no heating medium pipe 30 is provided and (ii) a region in which the heating medium pipes 30 are provided, respectively.

Note here that the temperature measuring sections "provided in the region in which no heating medium pipe is provided" herein means that the temperature measuring sections are provided on the outer surface of the reaction vessel which outer surface falls under a region (the region S in FIG. 1) of the fluidized bed in which region no heating medium pipe is provided when the fluidized bed is viewed from the horizontal direction. Note also that the temperature measuring sections "provided in the region in which the heating medium pipes are provided" herein means that the temperature measuring sections are provided on the outer surface of the reaction vessel which outer surface falls under a region (the region R in FIG. 1) of the fluidized bed in which region the heating medium pipes are provided when the fluidized bed is viewed from the horizontal direction.

According to the present apparatus, it is impossible to carry out temperature control, with use of a heating medium pipe, with respect to the region (region S in FIG. 1) of the fluidized bed in which region no heating medium pipe is provided. This makes it particularly important to understand the state of reaction in the region.

In a case where the temperature measuring sections are provided in the region in which the heating medium pipes are provided, it is, of course, possible to understand the state of reaction also in the region (region R in FIG. 1) in which the heating medium pipes are provided. Furthermore, in a case where the temperature measuring sections are provided in the region in which the heating medium pipes are provided, the temperature measuring sections are provided preferably in a region, close to the gas supply port, of the region in which the heating medium pipes are provided, and more preferably in the vicinity of the gas supply port.

In order to exhibit (display) a temperature measured by a temperature measuring section (i.e., a measurement result), the present apparatus can further include a measurement result displaying section. A method in which the measurement result displaying section displays the measurement result obtained from the temperature measuring section is not limited to any particular method. The measurement result displaying section can be, for example, an electric bulletin board or a liquid crystal display screen. A method by which to connect the temperature measuring section and the measurement result displaying section is not limited to any particular method. The temperature measuring section and the measurement result displaying section can be connected via a wire or can be wirelessly connected.

The measurement result displaying section can further include a control section configured to control the temperature measuring section. The control section can be configured to include, for example, a central processing unit (CPU), a ROM, a RAM, a communication section, a storage device, an input device, and a display device. According to an embodiment of the present invention, the measurement result displaying section and the control section can be configured to be integrated into a single member.

[3. Method for Producing Trichlorosilane]

A method in accordance with an embodiment of the present invention for producing trichlorosilane is a method for producing trichlorosilane ($SiHCl_3$) by reacting metallurgical grade silicon powder (Si) and hydrogen chloride gas (HCl), the method including a temperature measuring step of measuring, from an outside of a reaction vessel of a fluidized bed reactor, a temperature inside the reaction vessel.

In the temperature measuring step of the present production method, a plurality of temperature measuring sections provided on an outer surface of a reaction vessel can be used to measure, from an outside of the reaction vessel, a temperature inside the reaction vessel. Such temperature measuring sections are not limited to any particular temperature measuring sections. Note, however, that those temperature measuring sections are suitably the temperature measuring sections specifically described earlier in [Fluidized Bed Reactor].

The temperature measuring step can further include exhibiting (displaying) a measured temperature (measurement result) in, for example, the measurement result displaying section (described earlier).

According to the present production method, a frequency at which a temperature inside the reaction vessel is measured by the temperature measuring sections in the temperature measuring step is not limited to any particular frequency. A frequency at which to measure a temperature inside the reaction vessel with use of the temperature measuring sections can be determined as appropriate by causing the control section (described earlier) to control the temperature measuring sections.

(Control Step)

The present production method preferably further includes a control step of controlling an amount of supply of hydrogen chloride gas in accordance with a result of the temperature measuring step.

A state of reaction between metallurgical grade silicon powder and hydrogen chloride gas (in other words, a degree of reaction and also a degree of flow of metallurgical grade silicon powder) can be understood (estimated) from the result of the temperature measuring step.

According to the present production method, a flow of metallurgical grade silicon powder in a fluidized bed is caused by hydrogen chloride gas and optionally hydrogen gas each supplied to the fluidized bed. Thus, a degree of flow of metallurgical grade silicon powder can be adjusted by controlling an amount of supply of hydrogen chloride gas.

That is, the control step of an embodiment of the present invention is also adjusting a degree of flow of metallurgical grade silicon powder in the fluidized bed by, in accordance with the result of the temperature measuring step, determining a degree of flow of metallurgical grade silicon powder in the fluidized bed and controlling an amount of supply of hydrogen chloride gas to the fluidized bed. A degree of flow of metallurgical grade silicon powder can alternatively be adjusted by controlling an amount of supply of hydrogen gas to the fluidized bed. Thus, in the control step of an embodiment of the present invention, in addition to control of an amount of supply of hydrogen chloride gas to the fluidized bed, control of an amount of supply of hydrogen gas to the fluidized bed can be optionally carried out.

In the present production method, control of respective amounts of supply of hydrogen chloride gas and hydrogen gas to the fluidized bed can be carried out by a conventionally publicly known method. According to the present production method, in order to adjust a degree of flow of a metallurgical grade silicon powder in the fluidized bed, it is possible to control respective amounts of supply of hydrogen chloride gas and optionally hydrogen gas to the fluidized bed by increasing or reducing the respective amounts of supply of hydrogen chloride gas and optionally hydrogen gas to the fluidized bed. Alternatively, in order to adjust a degree of flow of metallurgical grade silicon powder in the fluidized bed, it is possible to control respective amounts of supply of hydrogen chloride gas and optionally hydrogen gas to the fluidized bed by carrying out control of the respective amounts of supply of hydrogen chloride gas and optionally hydrogen gas to the fluidized bed with respect to (i) a specific region of the fluidized bed or (ii) the entirety of the fluidized bed.

As described earlier in [Fluidized bed reactor], according to the present trichlorosilane producing method, a reaction between metallurgical grade silicon powder and hydrogen chloride gas (in other words, a flow of metallurgical grade silicon powder in the fluidized bed) preferably occurs, around a vertically extending central axis of the reaction vessel, substantially equally on a horizontal plane. Note here that "a flow of metallurgical grade silicon powder in the fluidized bed occurs, around a vertically extending central axis of the reaction vessel, substantially equally on a horizontal plane" can be rephrased as "a flow of metallurgical grade silicon powder in the fluidized bed is normal". Thus, the control step preferably has an object to achieve "a flow of metallurgical grade silicon powder in the fluidized bed is normal" in the present trichlorosilane producing method.

In preferable aspects of the temperature measuring step (described earlier) and the control step (described earlier), the above object is attained by carrying out the following operations:
(i) an operation to measure, from an outside of a reaction vessel of a fluidized bed reactor, a temperature inside the reaction vessel with use of a plurality of temperature measuring sections provided in a horizontal direction of an outer surface of the reaction vessel;
(ii) an operation to determine whether a difference between a maximum value and a minimum value of a plurality of results obtained in the above operation (i) (temperature measuring step) (in other words, a plurality of temperatures measured by the respective plurality of temperature measuring sections) falls within a desired range;
(iii) an operation to carry out, in a case where the difference between the maximum value and the minimum value does not fall within the desired range, an operation to adjust a degree of a flow of metallurgical grade silicon powder in a fluidized bed by controlling respective amounts of supply of hydrogen chloride gas and optionally hydrogen gas to the fluidized bed;
(iv) an operation to carry out the above operations (i) and (ii) again; and
(v) an operation to repeat the above operations (iii) and (iv) until the difference between the maximum value and the minimum value falls within the desired range. Note that the above operation (i) corresponds to the temperature measuring step and the above operations (ii) and (iii) each correspond to the control step.

The following description discusses a case where, in the temperature measuring step of the present production method, a temperature inside a reaction vessel of a fluidized bed reactor is measured from an outside of the reaction vessel with use of a plurality of temperature measuring sections provided in a horizontal direction of an outer surface of the reaction vessel. In this case, a difference between a maximum value and a minimum value of a plurality of results (temperatures) obtained in the temperature measuring step is preferably 0° C. to 25° C., more preferably 0° C. to 20° C., even more preferably 0° C. to 15° C., and particularly preferably 0° C. to 10° C.

Since the present production method includes the control step, a trichlorosilane reaction step can be controlled based on a temperature distribution in the reaction vessel of the fluidized bed reactor. This allows an increase in yield of resultant trichlorosilane.

An embodiment of the control step can be arranged such that supply of hydrogen chloride gas is reduced or stopped, or, on the contrary, increased based on the results of the temperature measuring step (described earlier).

The steps of the present production method other than those described earlier can be carried out by using conventionally publicly known methods as appropriate.

EXAMPLES

A method in accordance with an embodiment of the present invention for producing trichlorosilane was carried out with use of a fluidized bed reactor in accordance with an embodiment of the present invention. The following description specifically discusses how the method was carried out.

(Apparatus and Method)

A fluidized bed reactor similar to those illustrated in FIGS. 1 and 2 was used to produce trichlorosilane. For convenience, temperature measuring sections included in one of two rows of temperature measuring sections which one is provided on a vertically lower side were used as lower surface thermometers (hereinafter also merely referred to as "thermometers").

Note that the thermometers were horizontally evenly provided such that three thermometers to four thermometers are circumferentially arranged per meter in a single row.

Metallurgical grade silicon powder and hydrogen chloride gas were supplied to the fluidized bed reactor (described earlier) so that trichlorosilane was produced. During production of trichlorosilane, the temperature measuring step of the present production method was carried out so that a plurality of temperatures measured by the respective temperature measuring sections serving as the lower surface thermometers were monitored for a change in temperature.

(Result)

A result of the monitoring reveals that a temperature indicated by a thermometer of the lower surface thermometers which thermometer was present in a range of an angle of 30° to 200° was higher by 50° C. than a temperature indicated by a thermometer of the lower surface thermometers which thermometer was present in another place (a range of an angle of not less than 0° and less than 30° and more than 200° and less than 360°). Thus, production of trichlorosilane was stopped, and a state of damage to each member of the fluidized bed reactor was observed. As a result, in a distributor plate located in the above range of 30° to 200°, (i) one distributor nozzle which had been completely broken and (ii) ten distributor nozzles whose hole diameters had been greatly increased by erosion were observed.

The above description shows that the present production method makes it possible to understand an anomaly in a state of reaction between metallurgical grade silicon powder and hydrogen chloride gas, the anomaly having been caused by damage to each member of the fluidized bed reactor.

(Recap)

A fluidized bed reactor in accordance with a mode of the present invention is a fluidized bed reactor configured to generate trichlorosilane by reacting metallurgical grade silicon powder and hydrogen chloride gas, the fluidized bed reactor including: a reaction vessel; and a plurality of temperature measuring sections, provided on an outer surface of the reaction vessel, each for measuring a temperature inside the reaction vessel.

The fluidized bed reactor in accordance with a mode of the present invention is preferably configured such that the outer surface of the reaction vessel on which outer surface the plurality of temperature measuring sections are provided is located in a vicinity of a gas supply port provided in a lower part of the reaction vessel.

The fluidized bed reactor in accordance with a mode of the present invention is preferably configured such that the plurality of temperature measuring sections are provided along an entire circumference of the outer surface of the reaction vessel.

A fluidized bed reactor in accordance with a mode of the present invention is preferably configured to further include: a heating medium pipe provided above the gas supply port in the reaction vessel, the plurality of temperature measuring sections including a temperature measuring section that is provided in a region in which no heating medium pipe is provided.

The fluidized bed reactor in accordance with a mode of the present invention is preferably configured such that the plurality of temperature measuring sections further include a temperature measuring section that is provided in a region in which the heating medium pipe is provided.

A method in accordance with a mode of the present invention for producing trichlorosilane is a method for producing trichlorosilane by reacting metallurgical grade silicon powder and hydrogen chloride gas, the method including: a temperature measuring step of measuring, from an outside of a reaction vessel of a fluidized bed reactor, a temperature inside the reaction vessel.

A method in accordance with a mode of the present invention for producing trichlorosilane is preferably configured to further include a control step of controlling an amount of supply of hydrogen chloride gas in accordance with a result of the temperature measuring step.

INDUSTRIAL APPLICABILITY

As compared with a conventional fluidized bed reactor or a conventional method for producing trichlorosilane, the present apparatus or the present production method makes it possible to stably measure a temperature inside a fluidized bed reactor while no damage is caused to a temperature measuring section. Thus, the present apparatus or the present production method can be suitably used so that trichlorosilane is generated by reacting metallurgical grade silicon powder and hydrogen chloride gas.

REFERENCE SIGNS LIST

1 Fluidized bed reactor
10 Reaction vessel
20 distributor plate
30 Heating medium pipe
40 Fluidized bed
50 Temperature measuring section
101 Gas supply port
102 Outlet
R Region
S Region

The invention claimed is:

1. A fluidized bed reactor configured to generate trichlorosilane by reacting metallurgical grade silicon powder and hydrogen chloride gas, the fluidized bed reactor comprising:
a reaction vessel; and
a plurality of temperature measuring sections, provided on an outer surface of the reaction vessel, each for measuring a temperature distribution inside the reaction vessel from a temperature of the outer surface of the reaction vessel.

2. The fluidized bed reactor as set forth in claim 1, wherein the outer surface of the reaction vessel on which outer surface the plurality of temperature measuring sections are provided is located in a vicinity of a gas supply port provided in a lower part of the reaction vessel.

3. The fluidized bed reactor as set forth in claim 2, wherein the plurality of temperature measuring sections are provided along an entire circumference of the outer surface of the reaction vessel.

4. A fluidized bed reactor as set forth in claim 2, further comprising:
a heating medium pipe provided above the gas supply port in the reaction vessel,
the plurality of temperature measuring sections including a temperature measuring section that is provided in a region in which no heating medium pipe is provided.

5. The fluidized bed reactor as set forth in claim 4, wherein the plurality of temperature measuring sections further include a temperature measuring section that is provided in a region in which the heating medium pipe is provided.

6. A method for producing trichlorosilane by reacting metallurgical grade silicon powder and hydrogen chloride gas, the method comprising:
a temperature measuring step of measuring, from a temperature of an outer surface of a reaction vessel of a fluidized bed reactor, a temperature distribution inside the reaction vessel.

7. A method as set forth in claim 6, further comprising a control step of controlling an amount of supply of hydrogen chloride gas in accordance with a result of the temperature measuring step.

* * * * *